United States Patent
Håkansson et al.

(10) Patent No.: US 12,231,022 B2
(45) Date of Patent: Feb. 18, 2025

(54) ELECTRIC MACHINE

(71) Applicant: Volvo Car Corporation, Gothenburg (SE)

(72) Inventors: Emil Håkansson, Gothenburg (SE); Johan Andersson, Gothenburg (SE); Joakim Ehn, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 340 days.

(21) Appl. No.: 17/837,313

(22) Filed: Jun. 10, 2022

(65) Prior Publication Data
US 2022/0399778 A1    Dec. 15, 2022

(30) Foreign Application Priority Data

Jun. 14, 2021    (EP) .................................... 21179248

(51) Int. Cl.
*H02K 7/00* (2006.01)
*H02K 9/19* (2006.01)
*B60L 50/60* (2019.01)

(52) U.S. Cl.
CPC .............. *H02K 7/003* (2013.01); *H02K 9/19* (2013.01); *B60L 50/60* (2019.02)

(58) Field of Classification Search
CPC .. H02K 5/20; H02K 5/02; H02K 5/04; H02K 5/08; H02K 41/031; H02K 1/193; H02K 1/32; H02K 1/20; H02K 9/16; H02K 9/19; H02K 9/18; H02K 9/197; H02K 9/20; H02K 9/06; H02K 9/14
See application file for complete search history.

(56) References Cited

U.S. PATENT DOCUMENTS

| | | | |
|---|---|---|---|
| 10,680,478 B2 * | 6/2020 | Huber .................... | B60K 11/02 |
| 2018/0076687 A1 * | 3/2018 | Pritchard ............... | H02K 11/33 |
| 2018/0183309 A1 * | 6/2018 | Schroeder ............. | H02K 7/083 |

(Continued)

FOREIGN PATENT DOCUMENTS

| | | |
|---|---|---|
| CN | 112769268 A | 5/2021 |
| DE | 102017214507 A1 | 2/2019 |

(Continued)

OTHER PUBLICATIONS

Nov. 24, 2021 European Search Report issued in International Application No. 21179248.

*Primary Examiner* — Bryan R Perez
(74) *Attorney, Agent, or Firm* — Clements Bernard Walker; Christopher L. Bernard

(57) ABSTRACT

A rotor assembly including a body member, a first shaft member and a second shaft member. The body member includes an inner wall defining a cavity inside the body member. The first shaft member is inserted into the body member and extends at least partially in the cavity of the body member. The second shaft member is inserted into the body member and extends from a first end portion of the body member to a second end portion of the body member. The second shaft member is at least partially surrounded by the first shaft member. The first shaft member is configured to provide a medium along the inner wall of the body member, and the second shaft member is configured to provide the medium at each of the first end portion and the second end portion of the body member.

14 Claims, 2 Drawing Sheets

(56) References Cited

U.S. PATENT DOCUMENTS

| | | | |
|---|---|---|---|
| 2019/0097482 A1 | 3/2019 | Huber et al. | |
| 2019/0099791 A1* | 4/2019 | Hertel | B21B 45/08 |
| 2019/0393747 A1 | 12/2019 | Tang et al. | |
| 2020/0373815 A1* | 11/2020 | Lang | H02K 7/083 |
| 2020/0389073 A1 | 12/2020 | Lang et al. | |

FOREIGN PATENT DOCUMENTS

| | | |
|---|---|---|
| DE | 102018200865 A1 | 7/2019 |
| EP | 1892512 A2 | 2/2008 |
| EP | 3054564 A1 | 8/2016 |
| EP | 3687038 A1 | 7/2020 |

\* cited by examiner

ELECTRIC MACHINE

CROSS-REFERENCE TO RELATED APPLICATION

The present disclosure claims the benefit of priority of co-pending European Patent Application No. 21 179 248.6, filed on Jun. 14, 2021, and entitled "ELECTRIC MACHINE," the contents of which are incorporated in full by reference herein.

TECHNICAL FIELD

The present disclosure relates to a rotor assembly for an electric machine, an electric machine including such a rotor assembly, a vehicle including such an electric machine and a manufacturing method for such a rotor assembly.

BACKGROUND

Electric machines are used in electric or hybrid vehicles as a traction motor. The traction motor in vehicles is generally configured to generate power for providing a wheel torque to propel the vehicle and to recover braking energy if a regenerative braking system is used. Such electric machines may however produce significant heat inside them. For example, heat may be generated in an electric machine due to an electric resistance in electric current flowing through a rotor and/or stator, hysteresis losses due to changing magnetic fields and resistive heating of eddy currents caused by magnetic fields. Additionally, heat may be also generated due to mechanical friction among components in the electric machine.

In electric machines, however, thermal capacities of rotor magnets and stator windings affect available output power of the electric machines. The rotor magnets typically have a thermal limit of 150° C. and when temperature increases above the thermal limit, demagnetization may occur which reduces performance of the electric machine.

SUMMARY

There may be a need to provide an improved electric machine, which facilitates an efficient heat transfer.

The problem is at least partially solved or alleviated by the subject matter of the present disclosure. It should be noted that the aspects of the disclosure described in the following apply to the rotor assembly for an electric machine, the electric machine including such a rotor assembly, the vehicle including such an electric machine and the manufacturing method for such a rotor assembly.

According to the present disclosure, a rotor assembly is presented. The rotor assembly includes a body member, a first shaft member and a second shaft member. The body member includes an inner wall defining a cavity inside the body member. The first shaft member is inserted into the body member and extends at least partially in the cavity of the body member. The second shaft member is inserted into the body member and extends from a first end portion of the body member to a second end portion of the body member. The second shaft member is at least partially surrounded by the first shaft member. The first shaft member is configured to provide a medium along the inner wall of the body member, and the second shaft member is configured to provide the medium at each of the first end portion and the second end portion of the body member.

The rotor assembly according to the present disclosure may increase a heat transfer inside the rotor assembly by providing the medium separately in the cavity of the body member. The medium may be in a gas state, a liquid state or a mixing state of gas and liquid. The medium may be water, oil, air or water vapour or the like. The medium may be selected so that it is suitable for transferring heat. By arranging two separate shaft members, which provide the medium at separate positions in the body member of the rotor assembly, an efficient distribution of the medium in the body member can be achieved. Hence, the heat transfer inside the rotor assembly may be significantly improved and its performance may be improved.

The body member of the rotor assembly may be formed substantially in a cylinder shape. The body member may include a plurality of magnets arranged around an outer surface of the body member. The magnets may be permanent magnets and configured to rotate the body member due to electromagnetic energy. Between the first end portion and the second end portion a cylindrical cavity may be formed, which may extend from the first end portion and the second end portion of the body member. In other words, the body member may include the inner wall extending from the first end portion and the second end portion of the body member, thereby defining the cavity.

The first shaft member may be arranged at the first end portion of the body member or at the second end portion of the body member. The first shaft member may be separately manufactured and fixedly attached to the body member or integrally manufactured with the body member, thereby they may form a single piece. The first shaft member may extend from the first or second end portion of the body member in direction to the second or first end portion, respectively. Preferably, the first shaft member may extend substantially to a centre of the rotor assembly. In other words, the first shaft member may have a length less than an entire length of the body member.

The second shaft member may be inserted in the first shaft member and it may extend from one end portion to another end portion of the body member. The second shaft member may be also separately arranged in the first shaft member or integrally manufactured with the first shaft member and/or the body member. Since the first shaft member may have the length less than the length of the body member, the second shaft member may be surrounded by the first shaft member only for a corresponding length of the first shaft member, but not for the entire length of the second shaft member. In other words, the second shaft member may be at least partially exposed in the cavity of the body member.

The first shaft member and the second shaft member may extend along a same longitudinal axis, which may correspond to a rotation axis of the rotor assembly. However, they may be also arranged offset from the rotation axis of the rotor assembly in a radial direction of the rotor assembly.

The first shaft member may include a first medium passage in its inside. The first shaft member may further include a shaft end portion, which is exposed in the cavity of the body member. Accordingly, the first shaft member may provide the medium through the first medium passage and distribute the medium through the shaft end portion. Since the shaft end portion of the first shaft member may be positioned at the centre of the cavity, the first shaft member may be able to provide the medium substantially at the centre of the cavity or the body member.

The second shaft member may also include a second medium passage to allow a medium flow inside the second shaft member. The second medium passage of the second shaft member may be connected to each of the first end portion and the second end portion of the body member. Accordingly, the first end portion and second end portion of the body member may be provided with the medium independently of the first shaft member.

The medium provided through the first shaft member and the medium provided through the second shaft member may be the same or they may include a different composition.

In an embodiment, the first shaft member includes at least one cavity medium dispersion element exposed in the cavity of the body member. To provide the medium in the cavity, the first shaft member may include the cavity medium dispersion element at the shaft end portion of the first shaft member, which may be exposed substantially in the centre of the cavity of the body member. Accordingly, the cavity medium dispersion element allows the medium supplied through the first medium passage of the first shaft member to be dispersed inside the body member, to improve the heat transfer in the rotor assembly. The first shaft member may also include more than one cavity medium dispersion element around the first shaft member.

The cavity medium dispersion element may be any suitable means to distribute the medium in the cavity such as nozzle, spraying means or the like. The medium may be provided from the first shaft member to the inner wall of the body member. The medium may be then further distributed along the inner wall of the body member in the direction of the first end portion and/or the second end portion of the body member to transfer heat along the inner wall of the body member.

In an embodiment, the second shaft member includes a first medium distribution element arranged at the first end portion of the body member and a second medium distribution element arranged at the second end portion of the body member. The first medium distribution element and the second medium distribution element may be connected to the second medium passage arranged in the second shaft member for providing the medium at each of the first end portion and the second end portion of the body member. The first and the second medium distribution elements may be any suitable means to provide the medium such as nozzle, spraying means or the like.

The medium provided from the first medium distribution element and the second medium distribution element may be dispersed in the radial direction of the rotor assembly along the first end portion and the second end portion of the body member. Accordingly, the first and second end portions may be provided with the medium independently of the first shaft member.

In an embodiment, the cavity medium dispersion element, the first medium distribution element and/or the second medium distribution element include a nozzle element. The nozzle element may be arranged at the first shaft member and/or the second shaft member in a perpendicular direction to the rotation axis of the rotor assembly. Accordingly, the nozzle element may provide the medium in the radial direction of the rotor assembly to efficiently distribute the medium in the cavity of the body member. The nozzle element may be configured to adjust a flow rate and/or pressure of the medium. For instance, the nozzle element may be configured to increase the flow rate of the medium out of the first shaft member and/or second shaft member such that a turbulent flow of the medium may be generated.

In an embodiment, the cavity medium dispersion element, the first medium distribution element and/or the second medium distribution element may include a spraying means. The spraying means may be configured to effectively disperse the medium out of the first shaft member and/or second shaft member to the cavity of the body member.

In an embodiment, the first end portion of the body member includes a first outlet element extending from the cavity to an outside of the body member and the second end portion of the body member includes a second outlet element extending from the cavity to the outside of the body member. The first outlet element and the second outlet element may be formed as a channel or bore extending from the cavity in the radial direction of the rotor assembly and configured to release the medium outside the body member of the rotor assembly.

At each of the first outlet element and the second outlet element, the medium dispersed from the first shaft member and the second shaft member may be joined and collectively released out of the body member. The released medium may be further utilized for the heat transfer of components arranged outside the body member of the rotor assembly and/or the released medium may be guided to a medium circulation system.

In an embodiment, the rotor assembly further includes a hub element to provide the medium separately in the first shaft member and the second shaft member. In an embodiment, hub element is arranged at the first end portion of the body member.

The hub element may be arranged at an end portion of the body member at which both of the first shaft member and the second shaft member may be mounted. The hub element may be preferably arranged perpendicular to the rotation axis of the rotor assembly. The hub element may be configured to divide the medium before providing it in the first shaft member and the second shaft member. The hub element may thus include separate inlets for each of the first medium passage in the first shaft member and the second medium passage in the second shaft member. Accordingly, the first shaft member and the second shaft member may deliver the medium inside the body member independently of each other.

In an embodiment, the hub element is connected to an actuator to supply the medium. The actuator may be a pump means configured to continuously provide the medium to the first shaft member and the second shaft member at a predefined flow rate via the bub element. The actuator may be directly arranged at the hub element. The medium released out of the body member may be collected and guided to the actuator after a heat recovery process to allow a reliable circulation of the medium.

In an embodiment, the medium may be an oil. The oil may be any lubricant, which may be adapted to reduce friction and heat between surfaces in mutual contact. The oil, which may be provided in a form of fine drops, may allow an efficient heat transfer in the cavity of the rotor assembly.

According to the present disclosure, an electric machine is presented. The electric machine includes a stator unit and a rotor assembly as described above. The rotor assembly is arranged inside the stator unit coaxially with the stator unit.

The electric machine can be understood as an electromechanical converter that may generate mechanical power from electrical energy. Mechanical output, which may be transferred via a shaft, may act as a propulsion means for operating a device. The electric machine may include a housing, in which the stator unit and the rotor assembly may be coaxially arranged, wherein the stator unit may be fixedly arranged in the housing and the rotor assembly may be configured to rotate inside the stator unit around a longitudinal axis of the electric machine. Each of the stator unit and the rotor unit may include a plurality of magnets including a permanent magnet or an electromagnet including coil windings.

Hence, heat, which may be generated in the electric machine due to electric resistances and/or mechanical friction among components, may be transferred to a medium provided in the rotor assembly and the electric machine may be efficiently cooled. Accordingly, the medium may be act as a coolant. Furthermore, a balancing of the rotor assembly in the electric machine may be improved and an inertia of the rotor assembly may be reduced.

In an embodiment, the rotor assembly is configured to release a medium from a body member to the stator unit via a first outlet element and/or a second outlet element. The medium released out of the first outlet element and the second outlet element of the body member may be directed to the stator unit arranged outside the rotor assembly. Hence, not only the rotor assembly but also the stator unit surrounding the rotor assembly may be cooled and a thermal management in the electric machine may be improved.

In an embodiment, a first end portion of the body member of the rotor assembly is arranged at a non-drive side of the electric machine. The term "non-drive end" may be understood as a side of the electric machine, which may not be connected to a drive unit of a device to be propelled by the electric machine. In an embodiment, a first shaft member, a second shaft member and a hub element may be also arranged at the non-drive side of the electric machine. Accordingly, a medium distribution between the first shaft member and the second shaft member may be facilitated.

In an embodiment, a first shaft member of the rotor assembly is configured to cool the body member of the rotor assembly. A cavity medium dispersion element arranged at a shaft end portion of the first shaft member may be exposed substantially in a centre of the cavity of the body member. Hence, the cavity medium dispersion element allow the medium supplied through the first shaft member to be dispersed inside the body member. Since the body member of the rotor assembly may be surrounded by the plurality of magnets, the medium may also cool an inner portion of the magnet elements.

In an embodiment, a second shaft member of the rotor assembly is configured to cool windings of the stator unit. The second shaft member extending from a first end portion to a second end portion of the body member may deliver the medium directly to the stator unit via the first outlet element and the second element. Hence, the medium provided by the second shaft member may not be dispersed in the cavity of the body member, but directly guided to the stator unit with maintaining a low medium temperature.

Accordingly, the electric machine according to the present disclosure allows a separate and selective cooling of the body member of the rotor assembly and the stator unit with respect to operating requirements. By controlling the heat transfer between the rotor assembly and the stator unit, energy loss in the electric machine may be decreased and efficiency of the electric machine may be improved.

According to the present disclosure, a vehicle is presented. The vehicle includes an electric machine as described above. The vehicle is a battery electric vehicle or a hybrid electric vehicle. In such vehicles, the electric machine may act as a traction motor supply power to wheels to propel the vehicle. The traction motor may however produce significant heat inside the electric machine. The vehicle according to the present disclosure allows an improved thermal management of the electric machine by providing separate coolant inflow inside a rotor assembly of the electric machine.

According to the present disclosure, a manufacturing method for a rotor assembly for an electric machine is presented. The method includes:
  providing a body member including an inner wall defining a cavity inside the body member,
  inserting a first shaft member into the body member, the first shaft member extending at least partially in the cavity of the body member,
  inserting a second shaft member into the body member, the second shaft member extending from a first end portion of the body member to a second end portion of the body member, and
  surrounding the second shaft member at least partially by the first shaft member.

The first shaft member is configured to provide a medium along the inner wall of the body member, and the second shaft member is configured to provide the medium at each of the first end portion and the second end portion of the body member.

It should be noted that the above embodiments may be combined with each other irrespective of the aspect involved. Accordingly, the method may be combined with structural features and, likewise, the system may be combined with features described above with regard to the method.

These and other aspects of the present embodiments will become apparent from and elucidated with reference to the embodiments described hereinafter.

BRIEF DESCRIPTION OF THE DRAWINGS

Exemplary embodiments will be described in the following with reference to the following drawings.

DESCRIPTION OF EMBODIMENTS

Figure 1:
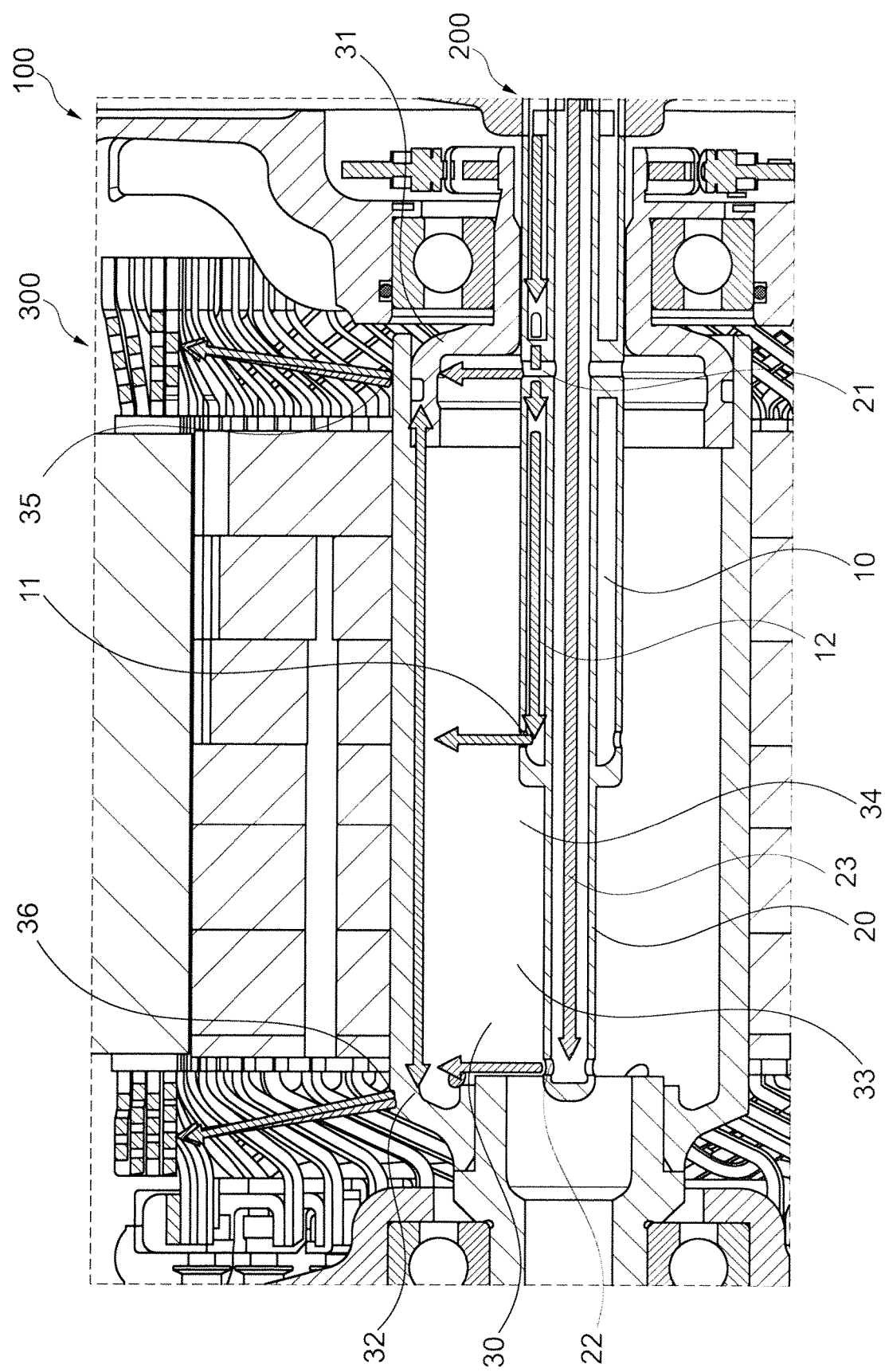
FIG. 1 shows schematically and exemplarily an embodiment of an electric machine according to the present disclosure.

FIG. 1 shows an electric machine 100, which may be mounted in a battery electric vehicle (BEV) or a hybrid electric vehicle (HEV) to provide kinetic energy to wheels of the vehicle, accordingly to propel the vehicle. Hence, the electric machine 100 acts as a traction motor, which generates, however, significant heat due to electromagnetic resistance or friction among components of the electric machine 100. The electric machine 100 includes a stator unit 300 and a rotor assembly 200. The rotor assembly 200 is arranged coaxially inside the stator unit 300 and configured to rotate around a longitudinal axis of the electric machine 100, whereas the stator unit 300 is arranged stationarily.

The rotor assembly 200 includes a body member 30, a first shaft member 10 and a second shaft member 20. The body member 30 includes an inner wall 33 defining a cavity 34 inside the body member 30. The body member 30 includes a first end portion 31 coupled with both of the first shaft member 10 and the second shaft member 20, and a second end portion 32 coupled with the second shaft member 20. The first end portion 31 of the body member 30 may be a non-drive end side of the electric machine 100.

The first shaft member 10 is inserted into the body member 30 through the first end portion 31 and extends at least partially in the cavity 34 of the body member 30. Preferably, the first shaft member 10 extends to a centre of the body member 30. The second shaft member 20 is inserted into the body member 30 also through the first end portion 31 and extends from the first end portion 31 of the body member to the second end portion 32 of the body member 30. The second shaft member 32 is at least partially surrounded by the first shaft member 10.

Figure 2:
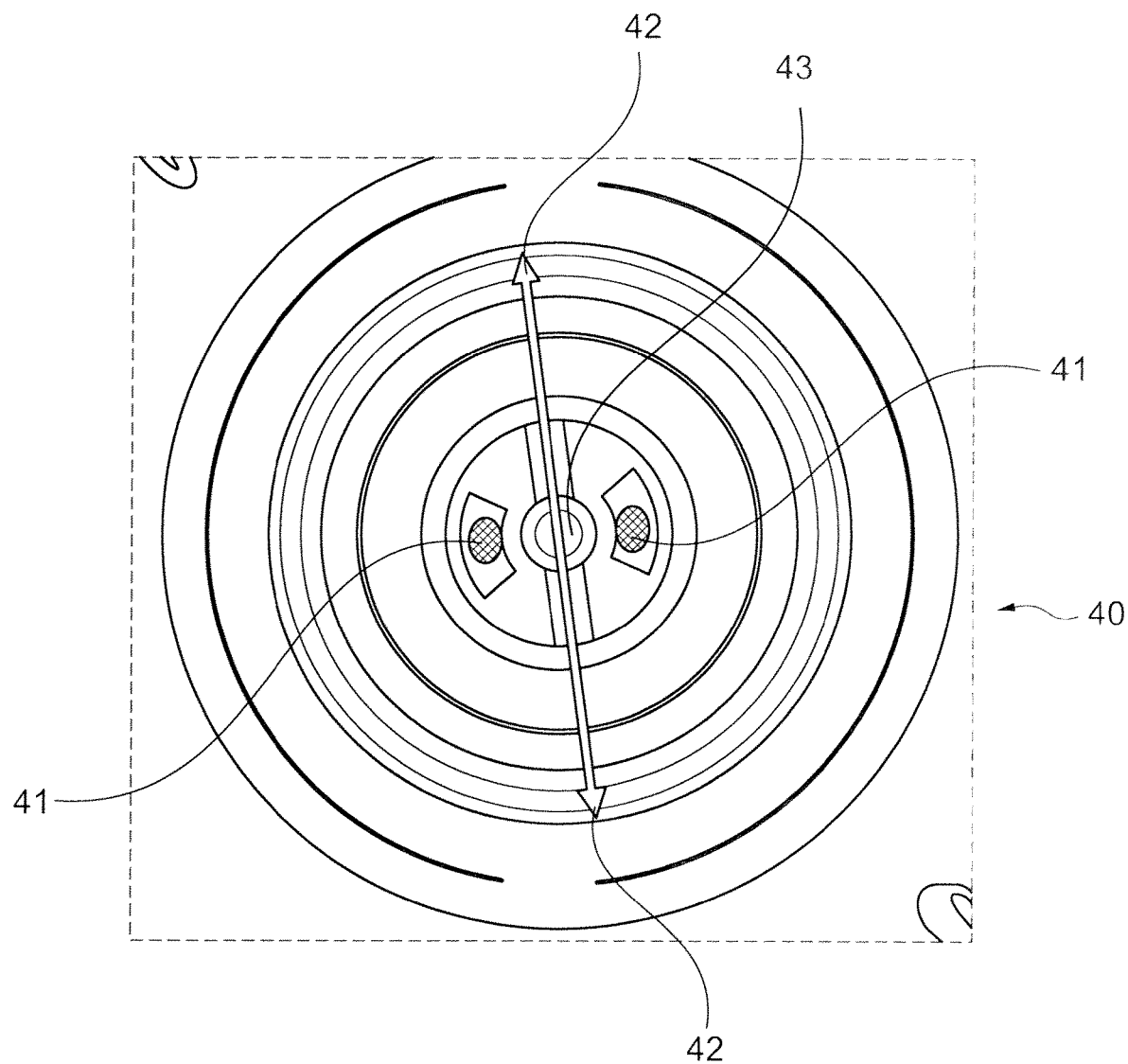
FIG. 2 shows schematically and exemplarily an embodiment of a hub element according to the present disclosure.

The rotor assembly 200 further includes a hub element 40 (see FIG. 2) to provide a medium separately in the first shaft member 10 and the second shaft member 20. The medium may be a coolant including water, oil, air or water vapour or the like. The medium may be selected so that it is suitable for transferring heat. The hub element 40 is arranged at the first end portion 31 of the body member 30, which is a non-drive end side of the electric machine 100.

The hub element 40 is connected to an actuator such as a pump means (not shown) to continuously provide the medium to the first shaft member 10 and the second shaft member 20 at a pre-defined flow rate. The hub element 40 includes at least one first shaft medium inlet 41 and at least one second shaft medium inlet 43. The first shaft medium inlet 41 is configured to provide the medium in a first medium passage 12 of the first shaft member 10 and the second shaft medium inlet 43 is configured to provide the medium in a second medium passage 23 of the second shaft member 20. By providing the medium via both 42 of the first shaft medium inlet 41 and the second shaft medium inlet 43, a maximal cooling, in other words soaking may be achieved.

The first shaft member 10 is configured to provide a medium along the inner wall 33 of the body member 30 and the second shaft member 20 is configured to provide the medium at each of the first and portion 31 and the second end portion 32 of the body member 30.

The first shaft member 10 includes at least one cavity medium dispersion element 11 exposed in the cavity 34 of the body member 30. The cavity medium dispersion element 11 is configured to distribute the medium supplied through the first shaft member 10 in the cavity 34 of the body member 30, preferably in a centre of the body member 30. Accordingly, the cavity medium dispersion element 11 and/or the first shaft member 10 is configured to cool the body member 30 of the rotor assembly 100.

The second shaft member 20 includes a first medium distribution element 21 arranged at the first end portion 31 of the body member 30 and a second medium distribution element 22 arranged at the second end portion 32 of the body member 30. The first medium distribution element 21 and the second medium distribution element 22 are configured to provide medium supplied through the second shaft member 20 to each of the first end portion 31 and the second end portion 32 of the body member 30.

The first end portion 31 of the body member 30 includes a first outlet element 35 extending from the cavity 34 to an outside of the body member 30, preferably to the stator unit 300 and the second end portion 32 of the body member 30 includes a second outlet element 36 extending from the cavity 34 to the outside of the body member 30, preferably to the stator unit 300. The first outlet element 35 and the second outlet element 36 may be formed as a channel extending from cavity 34 of the body member 30 in direction of the stator unit 300. Hence, the first outlet element 35 and the second outlet element 36 are configured to release the medium from the body member 30 of the rotor assembly 200 to the stator unit 300. In other words, the second shaft member 20 is configured to cool windings of the stator unit 300.

The cavity medium dispersion element 11, the first medium distribution element 21 and/or the second medium distribution element 22 includes a nozzle element and/or a spraying means to adjust a flow rate and/or pressure of the medium provided through the first shaft member 10 and the second shaft member 20.

It has to be noted that embodiments of the disclosure are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed embodiments. Other variations to the disclosed embodiments can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A rotor assembly for an electric machine, the rotor assembly comprising:
   a body member;
   a first shaft member;
   a second shaft member; and
   a hub element;
   the body member comprising an inner wall defining a cavity inside the body member;
   the first shaft member being inserted into the body member and extending at least partially in the cavity of the body member;
   the second shaft member being inserted into the body member and extending from a first end portion of the body member to a second end portion of the body member;
   the second shaft member being at least partially surrounded by the first shaft member;
   the first shaft member being configured to provide a medium along the inner wall of the body member;
   the second shaft member being configured to provide the medium at each of the first end portion and the second end portion of the body member; and
   the hub element being configured to provide the medium separately through the first shaft member and the second shaft member.

2. The rotor assembly according to claim 1, the first shaft member comprising at least one cavity medium dispersion element exposed in the cavity of the body member.

3. The rotor assembly according to claim 1, the second shaft member comprising a first medium distribution element arranged at the first end portion of the body member and a second medium distribution element arranged at the second end portion of the body member.

4. The rotor assembly according to claim 3, wherein at least one of the cavity medium dispersion element, the first medium distribution element, and the second medium distribution element comprises a nozzle element.

5. The rotor assembly according to claim 1, wherein the first end portion of the body member comprises a first outlet element extending from the cavity to an outside of the body member and the second end portion of the body member comprises a second outlet element extending from the cavity to the outside of the body member.

6. The rotor assembly according to claim 1, the hub element being arranged at the first end portion of the body member.

7. The rotor assembly according to claim 1, the hub element being connected to an actuator to supply the medium.

8. An electric machine, comprising:
a stator unit; and
a rotor assembly, the rotor assembly being arranged inside the stator unit coaxially with the stator unit, wherein the rotor assembly comprises:
a body member;
a first shaft member;
a second shaft member; and
a hub element;
the body member comprising an inner wall defining a cavity inside the body member;
the first shaft member being inserted into the body member and extending at least partially in the cavity of the body member;
the second shaft member being inserted into the body member and extending from a first end portion of the body member to a second end portion of the body member;
the second shaft member being at least partially surrounded by the first shaft member;
the first shaft member being configured to provide a medium along the inner wall of the body member;
the second shaft member being configured to provide the medium at each of the first end portion and the second end portion of the body member; and
the hub element being configured to provide the medium separately through the first shaft member and the second shaft member.

9. The electric machine according to claim 8, the rotor assembly being configured to release the medium from the body member to the stator unit via a first outlet element and/or a second outlet element.

10. The electric machine according to claim 8, the first end portion of the body member of the rotor assembly being arranged at a non-drive side of the electric machine.

11. The electric machine according to claim 8, the first shaft member of the rotor assembly being configured to cool the body member of the rotor assembly.

12. The electric machine according to claim 8, the second shaft member of the rotor assembly being configured to cool windings of the stator unit.

13. A vehicle comprising the electric machine according to claim 8, the vehicle being a battery electric vehicle or a hybrid electric vehicle.

14. A manufacturing method for a rotor assembly for an electric machine, the manufacturing method comprising:
providing a body member comprising an inner wall defining a cavity inside the body member;
providing a hub element;
inserting a first shaft member into the body member, the first shaft member extending at least partially in the cavity of the body member;
inserting a second shaft member into the body member, the second shaft member extending from a first end portion of the body member to a second end portion of the body member; and
surrounding the second shaft member at least partially by the first shaft member;
the first shaft member being configured to provide a medium along the inner wall of the body member;
the second shaft member being configured to provide the medium at each of the first end portion and the second end portion of the body member; and
the hub element being configured to provide the medium separately through the first shaft member and the second shaft member.

* * * * *